Feb. 2, 1965 E. O. ENGELS 3,168,056
DOUGH STRETCHING APPARATUS
Filed July 13, 1961 5 Sheets-Sheet 1
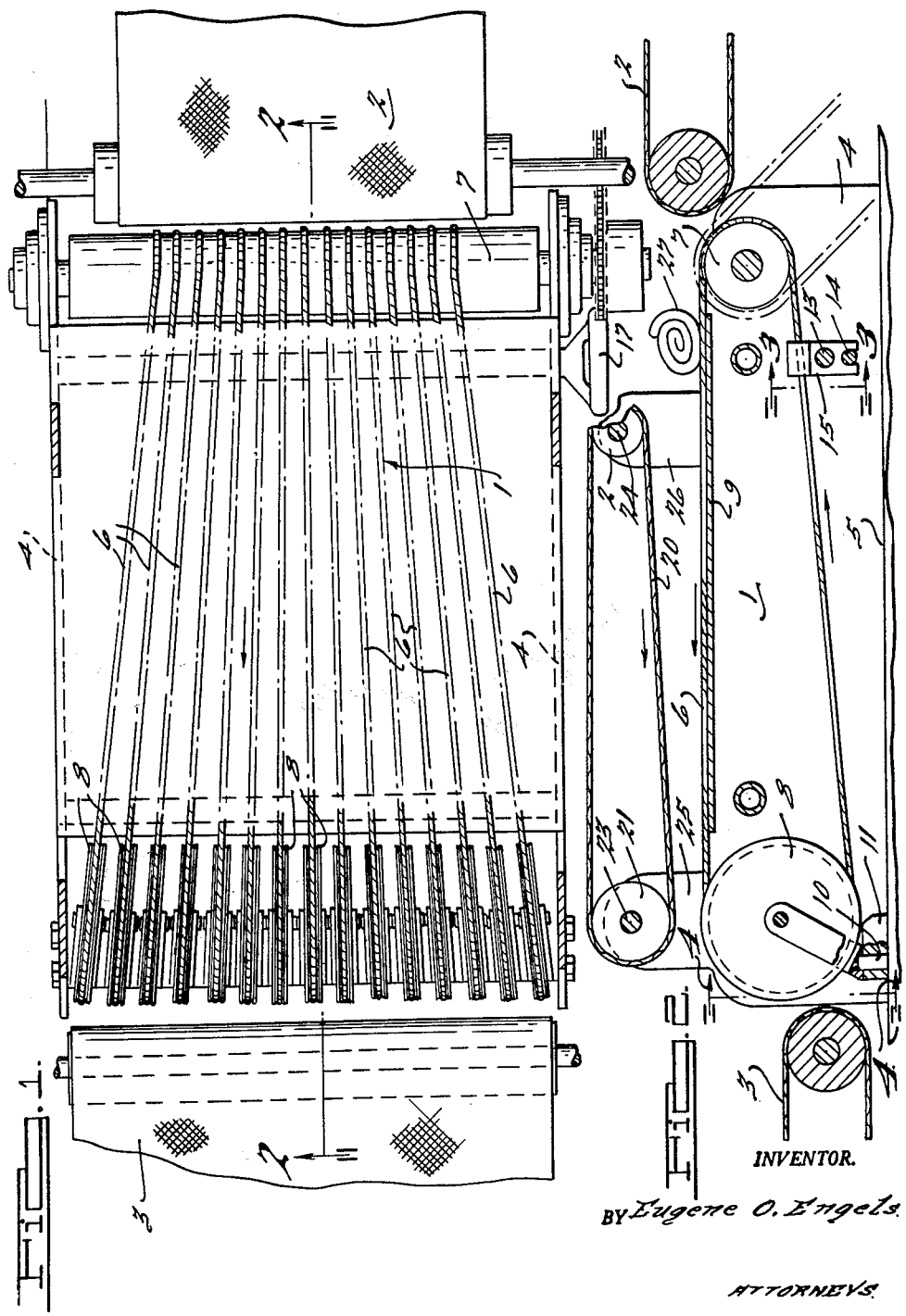
INVENTOR.
BY Eugene O. Engels
ATTORNEYS Feb. 2, 1965 E. O. ENGELS 3,168,056
DOUGH STRETCHING APPARATUS
Filed July 13, 1961 5 Sheets-Sheet 2
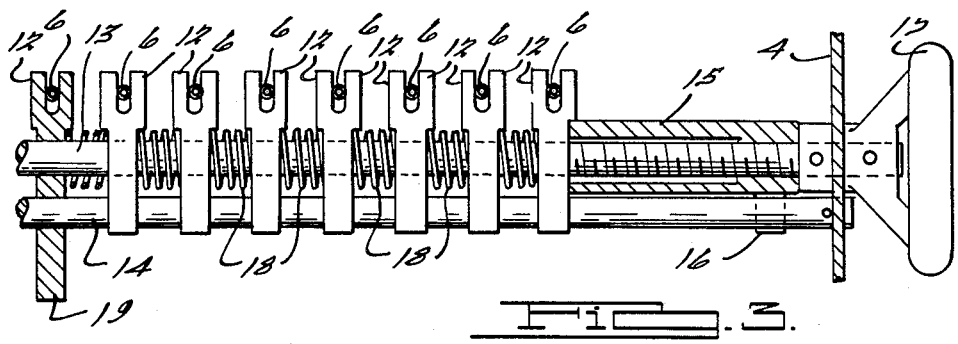
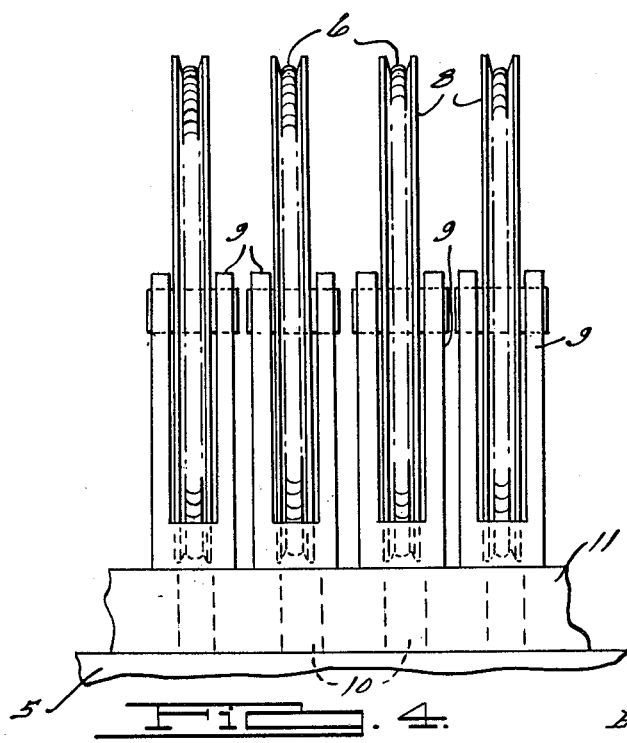
INVENTOR.
Eugene O. Engels.
BY
ATTORNEYS

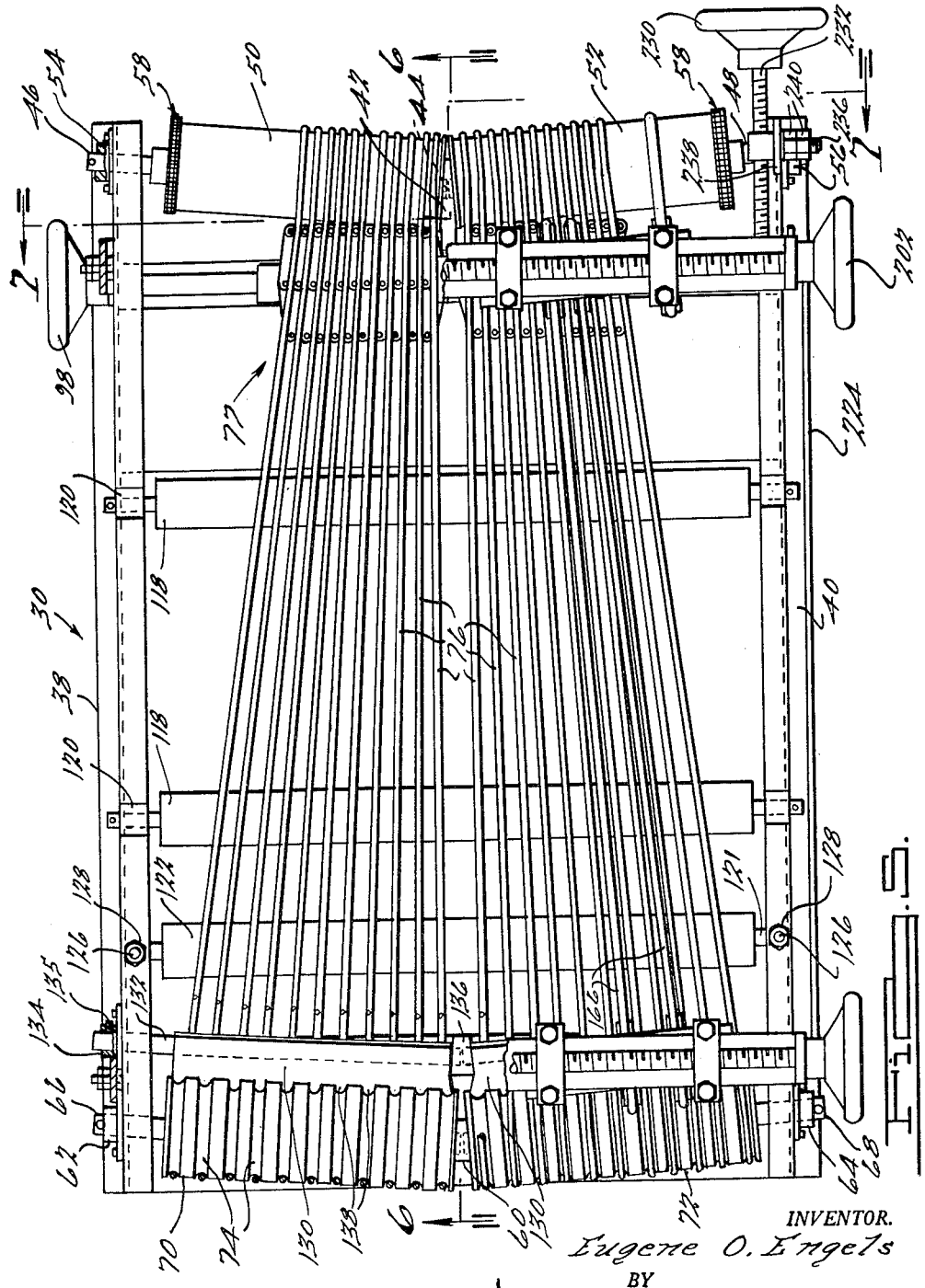

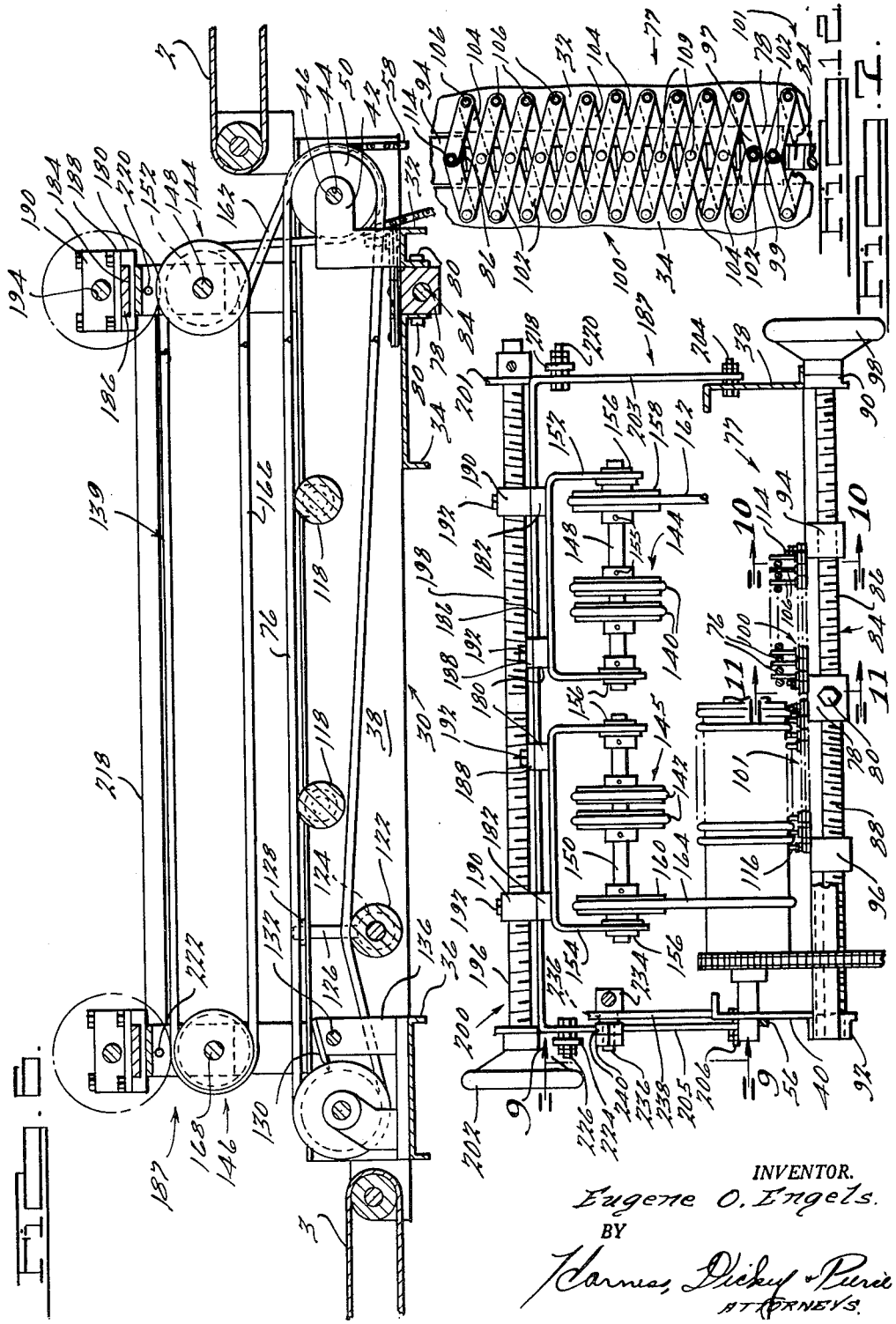

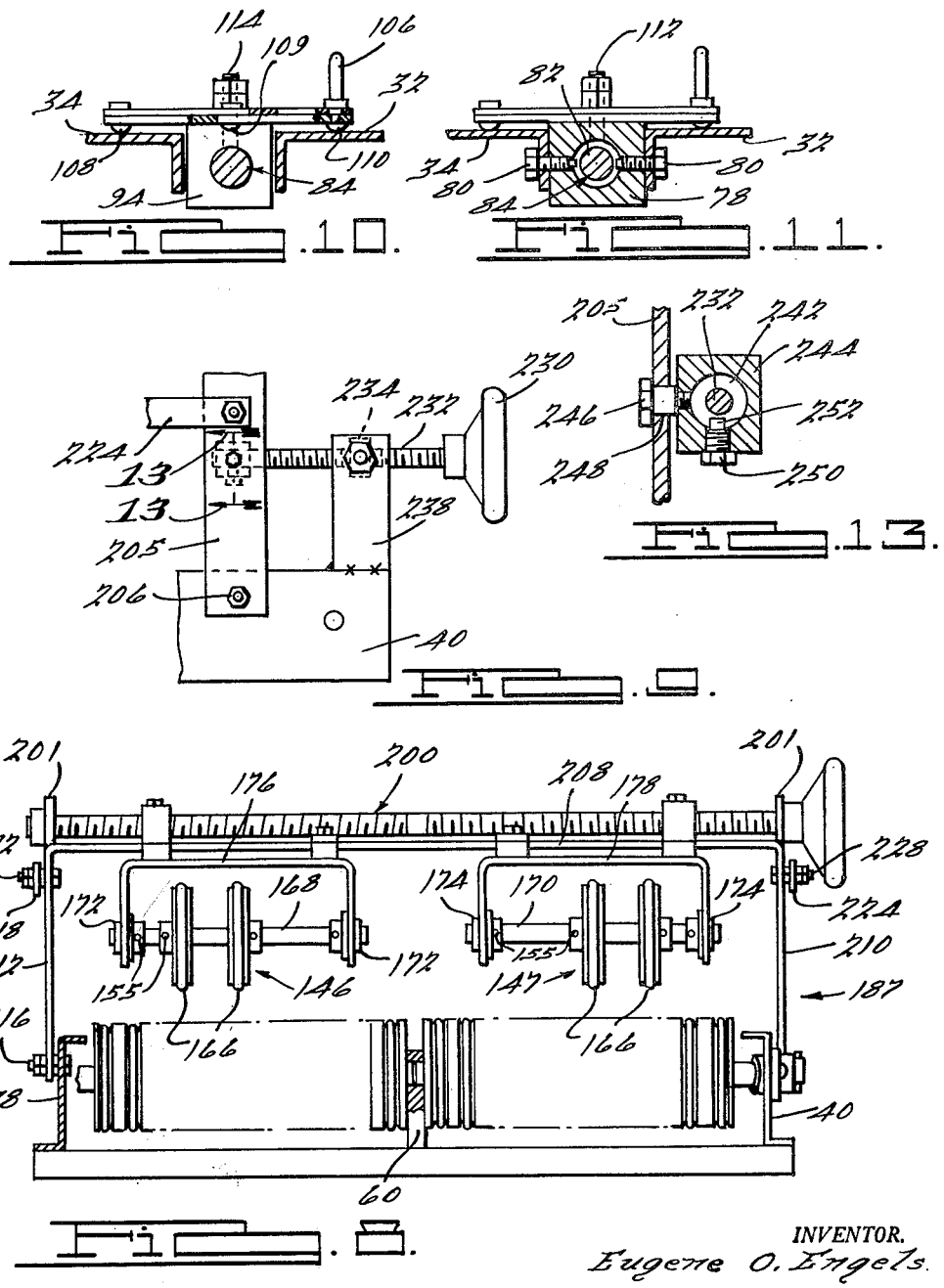

United States Patent Office — 3,168,056, Patented Feb. 2, 1965

3,168,056
DOUGH STRETCHING APPARATUS
Eugene O. Engels, 423 Brockway Place, Saginaw, Mich.
Filed July 13, 1961, Ser. No. 123,832
18 Claims. (Cl. 107—9)

The present invention relates to apparatus for stretching dough pieces and is of a type peculiarly suited for use in automatic bread making plants.

This application is a continuation-in-part of my copending Serial No. 26,116, filed May 2, 1960, now Patent No. 3,043,244, entitled Dough Stretching Apparatus, and FIGURES 1 through 4 herein were the subject of a requirement for division made in the above application.

In the manufacture of bread by automatic machinery, it is the conventional practice to roll a lump of proofed dough into a sheet and then, on a so-called "molding conveyor," coil the sheet into a cylindrical coil for deposit in the bread pans. After the dough is coiled and before it is placed in the pans, it is usually desirable to roll the coiled dough beneath a plate or pressure board for the purpose of sealing the edges. In addition, it is generally necessary to extend or increase the length of the coil of dough in order to make it fit the pan. In the past, this has been done by applying sufficient pressure on the pressure board to squeeze the dough out longitudinally as it is rolled between the molding conveyor and the pressure board. While the pressure board has been widely used for this purpose, it is subject to the defect that it imposes upon the dough piece an excessive degree of mechanical working which tends to rupture the dough and impair its character if it is used to extend the dough piece longitudinally. This difficulty increases as the diameter of the coil of dough increases and also in proportion to the amount of longitudinal stretching or extension required.

While in the manual making of bread it is possible for skilled bakers to stretch a dough piece to the proper length by manual manipulation, this is not practical in high speed mechanical bread making operations and no satisfactory method has been devised to solve the problem. In the absence of a solution to the problem, it has been the practice to go to considerable trouble to produce a dough piece of the right dimensions so that the coil will fit the pan with a minimum of stretching under the pressure board. When this can be done, satisfactory results are achieved, but it is not always feasible nor is it easily achieved. Another expedient employed is to form a loaf by twisting two slender coils of dough to produce so-called "twist" bread. In this case, the fact that each of the two coils is quite slender minimizes the severity of the working under the pressure board. This expedient is however more complicated and expensive since it requires twice as many pieces of dough and further requires an automatic dough piece twisting mechanism.

Accordingly, it is a principal object of the present invention to device apparatus for effectively stretching a dough piece to a desired longitudinal dimension which does not involve any excessive working of the dough piece and yet uniformly or otherwise stretches each portion of the dough piece to the desired degree.

A further object of the invention is to provide apparatus of the type mentioned which is easily adjusted so that it will extend or stretch dough pieces to any desired degree within relatively wide limits.

Another object of the present invention is to provide an apparatus of the type mentioned which is simple and inexpensive in construction and capable of being operated at any desired speed to accommodate the production rate of any automatic bread making plant.

A further object is to provide adjustable means for holding the dough pieces firmly on the stretching belts of the above apparatus.

Another object is to provide novel belt supporting rollers and supports therefor which provide for easy and fast replacement of the dough stretching belts.

A further object is to provide dough stretching belts for the above apparatus which do not adhere to the dough.

Another object is to provide a novel arrangement of belt supporting rollers which reduces belt fatigue normally occurring in dough stretching apparatus.

A further object is to provide the above apparatus with improved means for preventing excessive sagging of the dough stretching belts.

In the drawings:

FIGURE 1 is a plan view of one form of the invention with the top pressure conveyor removed in order to show the major portions of the apparatus;

FIGURE 2 is a sectional view taken on the line 2—2 of FIGURE 1 showing the upper pressure conveyor installed in place;

FIGURE 3 is a fragmentary sectional view taken on the line 3—3 of FIGURE 2;

FIGURE 4 is a fragmentary sectional view taken on the line 4—4 of FIGURE 2;

FIGURE 5 is a plan view of a preferred form of the invention with the top pressure conveyor removed in order to show the major portions of the apparatus;

FIGURE 6 is a sectional view taken on the line 6—6 of FIGURE 5 in the direction of the arrows;

FIGURE 7 is a partial cross-sectional view of the apparatus of FIGURE 5 taken along the line corresponding to 7—7 thereof in the direction of the arrows;

FIGURE 8 is an end view of the apparatus of FIGURE 5 taken in the direction indicated "8" of FIGURE 5 with portions of the base and roller supports broken away;

FIGURE 9 is a side view of the height adjusting mechanism for the upper pressure conveyor taken in the direction along the line 9—9 of FIGURE 7 in the direction of the arrows;

FIGURE 10 is a cross-sectional view of the belt spacing adjusting mechanism taken along the line 10—10 of FIGURE 7 in the direction of the arrows;

FIGURE 11 is a cross-sectional view of the belt spacing mechanism taken along the line corresponding to 11—11 of FIGURE 7 in the direction of the arrows;

FIGURE 12 represents a top plan view of the parallelogram belt spacer; and

FIGURE 13 represents a cross-sectional view of FIGURE 9 taken along the line 13—13 in the direction of the arrows.

Referring to the apparatus shown in FIGURES 1–4, the apparatus consists of a special form of conveying means indicated generally by the numeral 1 which is adapted to receive a sheet or coil of bread dough from a conveyor 2 which may be the molding conveyor and deliver it directly to the bread pans or to an intermediate conveyor 3 which in turn delivers the dough piece to a bread pan.

It is preferred that the apparatus be used to stretch a dough piece after it has been coiled into a cylindrical coil by a conventional coiling mechanism. If the coiled dough is to be sealed by passing it or rolling it between a molding conveyor and a pressure board, this operation should be done prior to discharge of the coiled dough piece from the conveyor 2 onto the conveyor 1. However, care should be taken to minimize the pressure exerted by the pressure board during the sealing operation in order to avoid rupturing the dough piece. This is possible when the apparatus of the present invention is employed because it is not necessary for the pressure board to extend or stretch the dough piece.

As an alternative arrangement, the conveyor 1 may be used to stretch sheeted dough pieces prior to the coiling operation, in which event flat sheets of dough are discharged by the conveyor 2 directly onto the conveyor 1 and are stretched in a direction transversely of the latter conveyor. Thereafter, they are deposited on conveyor 3 where they are coiled and subsequently deposited in the bread pans.

The essential part of the apparatus resides in the construction of the conveyor section 1 which is supported between a pair of side frames 4 mounted on any suitable form of base indicated fragmentarily at 5. The conveyor 1 comprises a plurality of separate narrow spaced belts 6 all of which are trained over a single cylindrical drum 7 at one end and over individual pulleys 8 at the other, the arrangement being such that the belts, as they travel from right to left as viewed in FIGURES 1 and 2, diverge from each other.

The belts 6 are sufficiently narrow and spaced sufficiently far apart so that they will indent into the dough piece and thereby offer sufficient resistance to lateral slipping so that all portions of the dough piece along its length, measured transversely of the belt, will be stretched in proportion to the difference between the spacing of the belts at the cylindrical roller 7 and their spacing at the pulleys 8.

In order to prevent or limit sagging of the belts 6 and to limit sagging of the dough piece between the belts, there is provided a plate 9 which underlies the top run of all the belts 6, and normally either contacts the belt or is spaced a minute distance below their running position when not under load. The plate 9 is preferably formed of a smooth material having a very low coefficient of friction. While a smooth metallic plate such as stainless steel or chrome-plated metal may be employed, it is preferred to use a plate having a plastic or resinous coating which will not only offer minimum frictional resistance but also resist adherence to the dough pieces. Suitable materials of this type are: polytetrafluorethylene (Teflon); polymonochlorotrifluoroethylene (Kel-F); polymerized hexamethylene diamine salt of adipic acid (nylon); and other resins.

Each of the pulleys 8 is individually mounted for castering rotation about a vertical axis, as best shown in FIGURES 2 and 4. As there indicated, each pulley 8 is journaled between a pair of elements 9 of a fork member having a vertical stud 10 which is journaled for rotation in a transversely extending block 11 mounted on the base 5 between the side frame members 4. As a result of this arrangement, the caster-mounted pulleys 8 will always swing into a proper position to receive the belt 6 as they approach from the cylindrical drum 7.

The spacing of the belts on the drum 7 is controlled by a plurality of spaced fork members 12 which, as best shown in FIGURE 3, are slidably mounted upon a pair of cylindrical rods 13 and 14. Rod 14 is mounted at its ends on the side frame members 4 and rod 13 is journaled for rotation in the side frame members 4 immediately above the rod 14. At a point between the outermost fork member 12 and the adjacent side frame member 4, rod 13 is threaded and receives a tubular threaded nut 15 having a downwardly projecting pair of ears 16 which embrace the rod 14 to prevent rotation of the nut 15. There are two tubular nuts like the nut 15, one positioned at either side of the machine, and the threads at the opposite ends of the rod 13 for the respective nuts are of opposite hand so that when the shaft 13 is rotated by means of the hand wheel 17 the two nuts 15 move toward each other simultaneously or away from each other simultaneously and by like amounts in either case. Forks 12 are normally spaced apart by a plurality of springs 18 which surround the shaft 13 and are so positioned that one spring is located between each adjacent pair of forks. The springs thus serve to spread the forks apart. In the preferred arrangement shown in the drawings, all of the springs 18 are of equal length and strength or stiffness with the result that the spaces between the forks 12 remain equal regardless of the adjustment of the hand wheel 17. Thus, adjustments of the hand wheel move the forks closer together or farther apart while still maintaining their spacing uniform.

Since the belts 6 pass through the arms of the forks respectively in their travel toward the drum 7, they control the approach spacing and therefore the spacing of the belts on the drum 7. It will be understood that FIGURE 3 illustrates only half of the machine width and that the fork 12 which is provided with the elongated base 19 is fixed against longitudinal movement and is located on the longitudinal center line of the machine. An equal number of movable forks (not shown) are positioned on the rods 13 and 14 to the left of the fixed fork.

While, as previously indicated, the springs 18 are identical, it may be desirable for some purposes to stretch a portion of the coil or sheet of dough to a greater degree than another portion. This may be accomplished by having a variable spacing of the belts on the drum 7 in conjunction with the fixed or uniform spacing of the individual pulleys 8 or vice versa. For example, if it is desired to stretch the central portion of the dough piece to a greater extent than the ends, the springs 8 between the outermost forks 12 may be made of greater strength or may be augmented by additional spacing washers thereby reducing the amount of divergence between the outermost belts as compared with the inner belts.

The belts may be made of any desired material. They may, for example, comprise conventional molded rubber belting strips or they may comprise rubber, silicone rubber or plastic belts of circular or polygonal cross section with or without central reinforcing wires or strands. However, the preferred form illustrated in the drawings simply comprises a coil spring preferably made of chrome-plated steel or stainless steel tightly wound so that the coils contact or very nearly contact each other when the spring is not stretched.

For some purposes it may be desirable to apply a light pressure on the top of the dough piece to hold it against the conveyor belts 6 in order to prevent slipping transversely of the belts. This may be accomplished when desired by providing a pressure belt 20 carried by a pair of drums 21 and 22 which are mounted on shafts 23 and 24, respectively, carried by upstanding ears 25 and 26 constituting part of the side frame members 4. The belt 20, as shown in FIGURE 2, converges toward the top surface of the belts 6 at a rate which would conform to the reduction in thickness of the coil due to the stretching induced by the increase in spacing of the belts 6 as they travel from right to left in FIGURE 2. Belt 20 preferably comprises a smooth, flexible sheet of synthetic resinous material which will slide easily on the surface of the dough. The material of the surface may be any of the resinous materials proposed for the surface of the supporting plate 9 and the belt may be reinforced by a canvas or other stranded type of reinforcing backing. The upper pressure belt 20 is optional and need not be employed in many cases. When employed it is preferably driven by any suitable means (not shown) so that its surface travels at the same speed as do the belts 6 and in the direction of the arrow in FIGURE 2.

As an alternative construction, the belt 20 may be replaced by a second set of diverging belts constructed and arranged like the stretching belt unit 1 except that it will be upside down.

It will be apparent in the above description that if a coil of dough such as that indicated at 27 is deposited on the right-hand end of the conveyor 1, it will be transported toward the left-hand end and at the same time stretched in a direction transversely of the conveyor 1 in accordance with the degree of divergence of the belts 6 and will be deposited upon the belt 3 after having been elongated to the desired degree. The degree of divergence of the belts may be adjusted as desired by hand wheel 17.

Shown in FIGURES 5–13 is a preferred embodiment of applicant's apparatus. Referring to these figures, a frame generally indicated 30 comprises cross members 32, 34, and 36 spaced longitudinally of and secured to side members 38 and 40. A center roller support 42 is secured to cross member 32 and is provided with bearing aperture means 44 for receiving and rotatably supporting the inner ends of the support shafts 46 and 48 of rollers 50 and 52 respectively. The outer ends of the roller shafts 46 and 48 are suitably journaled in bearing means 54 and 56 secured to the sides 38 and 40 respectively of the frame 30. It is seen in FIGURE 5 that rollers 50 and 52 are mounted on substantially the same horizontal plane but in intersecting vertical planes and the inner bearing 44 for the shafts must be angularly constructed as shown by the dotted lines to accommodate this angularity of the shafts. Rollers 50 and 52 have a smooth outer surface and each is provided at its outer end with a sprocket and chain assembly generally indicated 58, the chain of which is connected to a drive motor for rotating the rollers at the same speed.

At the delivery or outlet end of the apparatus and mounted on frame 30 is a center bearing 60 and outboard bearings 62 and 64 for mounting the shafts 66 and 68 of rollers 70 and 72 respectively. Bearing 60 also has an angular shape to accommodate the angularly disposed shafts 66 and 68. These rollers are provided with a plurality of grooves 74 in which are mounted a plurality of dough stretching belts 76 also mounted on the rollers 50 and 52 at the feed or inlet end of the apparatus.

Referring to FIGURE 7, the belt spacing adjusting means generally designated 77 comprises a support block 78 stationarily mounted between the cross members 32 and 34 just forward of the inner ends of the rollers 50 and 52 and underneath the same and is provided with locating bolts 80 received in a groove 82 in a screw member generally indicated 84. Member 84 comprises a right-handed threaded portion 86 on one side of block 78 and a left-handed threaded portion 88 on the other side of said block. The ends of screw member 84 are mounted in suitable bearing means 90 and 92 located between members 32 and 34 adjacent the sides 38 and 40 respectively of the frame. Member 84 is freely rotatable in block 78, and in bearings 90 and 92, and portions 86 and 88 thereof are threadedly received in adjusting nuts 94 and 96 respectively. It is seen that as the hand wheel 98, which is fixed to member 84, is rotated to thereby rotate member 84, the nuts 94 and 96, slidable between members 32 and 34, will either spread apart or move toward each other depending upon the direction of rotation of handle 98 for a purpose hereinafter described.

Referring to FIGURES 10–12, the inner ends 97 and 99 respectively, of a pair of parallelogram or scissors type of expansible devices generally indicated 100 and 101 are pivotally secured to the top of block 78 by screws or bolts 102. These devices comprise a plurality of parallelograms consisting of a plurality of rod-like members 103 and 104 pivotally connected together at their extremities and at their centers by rivets 108, 109, and 110. As shown in FIGURE 10, each of the end rivets 110 has integrally formed therewith an upstanding pin 111. The outer ends of the parallelogram devices 100 and 101 are pivotally connected respectively to the nuts 94 and 96 by screws or bolts 114 and 116. It is seen that as the screw member 84 is rotated in such a direction as to spread nuts 94 and 96 apart, the parallelogram devices 100 and 101 will spread or expand to thereby position pins 111 further apart. It is noted that the undersides of the rivets 108 and 110 slide along the top of frame members 34 and 32 to provide stability for the pins 111. As shown in FIGURE 7, the pins 111 project upwardly between the bottom run of the belts 76 and it follows that as the parallelograms and pins 111 are spread apart, the belts 76 will spread apart on the rollers 50 and 52 to thereby change the degree of divergence of the belts 76. Since the belts 76 are stationarily positioned on the delivery end rollers 70 and 72, the degree of their divergence can readily be adjusted by the parallelogram devices provided at only the feed end of the apparatus. By rotating screw member 84 in the opposite direction, the parallelograms, pins 111, and belts 76 are moved closer together.

As shown in FIGURES 5 and 6, a pair of rollers 118 are mounted in suitable bearing means 120 secured to the frame side members 38 and 40, and support the top run of the belts 76 to prevent the weight of the dough and the weight of the belts themselves from sagging the belts and preventing proper contact between the dough and a plurality of dough hold-down belts described in detail below. As further shown in FIGURES 5 and 6, the shaft 121 of a slack take-up roller 122 is journaled in a pair of bearing means 124 secured to the ends of bolts 126 which extend through and are vertically adjustably mounted in the top flanges of the frame members 38 and 40. The vertical adjustment of roller 122 is made by either tightening or loosening the nuts 128 on the bolts 126.

Referring further to FIGURES 5 and 6, a pair of scraper members 130 are secured to shafts 132 supported in outboard supports 134 secured to the frame side members 38 and 40 and inboard support 136. The shafts 132 of these scrapers may be loosened in their supports 134 and 136 by loosening set screws 135 in the supports 134 and rotating the scraper blades and their scraping projections 138 out of the grooves 74 in the rollers to allow the shafts 132 to be withdrawn from their bearing sockets in the center support 136. It is particularly noted that each of the rollers 50, 52, 70 and 72 and each of the scrapers 130 can be moved axially away from their inner bearing sockets in supports 42, 60 and 136 respectively, to allow worn or broken ones of belts 76 to be replaced on the rollers 50, 52, 70 and 72 by stretching the belts over the inner ends of the rollers and scrapers to thereby oviate the necessity for completely disassembling the rollers and the scrapers from the frame.

Referring to FIGURES 6–8, the upper pressure conveyor generally indicated 139 which maintains the dough pieces in contact with the stretching belts 76 comprises two sets of dough hold down belts 140 and 142 mounted on feed end pulley sets 144 and 145 respectively, and on delivery end pulley sets 146 and 147 respectively. Any number of belts and pulley sets may be used as required for the particular job. The feed end pulley sets 144 and 145 are secured respectively to shafts 148 and 150 rotatably mounted on inverted U-shaped hangers 152 and 154 respectively, by suitable bearing means 156 secured in each of the legs of the hangers. Each of the pulleys is provided with a set screw 155 to adjust the position of the pulleys on their shafts. Pulley sets 144 and 145 are respectively provided with drive pulleys 158 and 160 secured to the shafts 148 and 150 and receive drive belts 162 and 164 which, as shown in FIGURE 6, are twisted into a figure 8 configuration and are mounted respectively on rollers 50 and 52. The delivery end pulley sets 146 and 147 shown in FIGURE 8 are respectively mounted on shafts 168 and 170 rotatably mounted in bearing means 172 and 174 in the legs of inverted U-shaped hangers 176 and 178. It is seen, therefore, that as rollers 50 and 52 are rotated counterclockwise to move the top run of the dough stretching belt 76 to the left in FIGURE 6, the bottom run 166 of belts 140 and 142 will move to the left. The belts 76, 140 and 142 are of the same construction as the belts 6.

Referring to FIGURE 7, each of the feed end hangers 152 and 154 are secured to a separate mounting block 180 and a separate outer mounting block 182. These blocks are provided with grooves in their tops as shown at 184 in FIGURE 6, which grooves slidably receive a cross bar 186 forming part of a parallelogram type of height adjusting mechanism generally designated 187 for the upper pressure conveyor 139, which adjusting mechanism is described in detail below. Blocks 180 and 182 are respectively provided with innercaps 188 and outer caps 190 secured to the blocks by bolts 192. The two outer caps 190 are provided with oppositely threaded bores 194 for each receiving one of the oppositely threaded portions 196 and 198 of a screw member generally indicated 200 rotatably mounted in projections 201 secured to the cross bar 186 adjacent each end thereof. It is seen that rotation of screw member 200 by means of the hand wheel 202 connected thereto will cause the outer caps 190 and their associated hangers 152 and 154 to come closer together or move further apart depending on the direction of rotation of member 200, due to the oppositely threaded portions 196 and 198 of the screw member. The delivery end pulley assemblies 146 and 147 as shown in FIGURE 8 are provided with identical structure to that of pulley assemblies 144 and 145 for adjusting the distance between these pulley assemblies with the exception of the cross bar 208 and is numbered in the identical manner to the adjusting structure shown in FIGURE 7 for assemblies 144 and 145.

The parallelogram type of height adjusting mechanism 187 for the upper pressure conveyor comprises the cross bars 186 and 208 which support the pulley assemblies for the upper pressure conveyor. Bar 186 is formed with a pair of downwardly extending legs 203 and 205 pivotally mounted at their lower portions by suitable bolt and nut assemblies 204 and 206 respectively, to the frame sides 38 and 40. Bar 208 is provided with downwardly extending legs 210 and 212 pivotally mounted at their lower ends to the adjacent frame members by bolt and nut assemblies in the same manner as legs 203 and 205 are mounted, leg 212 being shown as pivotally mounted to frame member 38 by bolt 216. The height adjusting mechanism further comprises a side rail 218 pivotally mounted at its opposite ends to legs 203 and 212 by suitable bolt and nut assemblies 220 and 222 respectively, and another side rail 224 is pivotally mounted at its opposite ends to legs 205 and 210 by bolt and nut assemblies 226 and 228 respectively. It is seen, therefore, that the feed end and delivery end pulley assemblies and their belts 140 and 142 are mounted on a collapsible or expandable parallelogram type of support and are moved in an arc with respect to the top run of the belts 76 by shifting the side rails 218, 224 and legs 203, 205, 210, 212 about their pivots either to the left or right in FIGURE 6.

As shown in FIGURES 5, 7, 9, and 13 the collapsing and expanding of the adjusting mechanism 187 can conveniently be done by a hand wheel 230 secured to a screw 232 threadably received in a block 234 having a bearing and shaft portion 236 pivotally mounted in an upstanding member 238 secured to the frame side member 40. Nuts 240 secure the block 234 on the member 238 while allowing rotation thereof. Screw member 232 is provided adjacent its inner end with a peripheral groove 242 received within a block 244 pivotally mounted on the leg 205 by bolt means 246 having a bearing portion 248 pivotally received in the leg 205 and having a threaded portion 249 received in the block 244. A bolt means 250 is threadably received in the block 244 and has a smooth bearing portion 252 slidably received in the groove 242 in screw 232 so that rotation of the screw tending to thread itself to the left or to the right through nut 234 as shown in FIGURES 5 and 9 will pivot leg 205 about its pivot point 206 to move the mechanism 187 and the belts 142 and 144 in an arcwise motion with respect to belts 76 to move the belts 142 and 144 closer to or further away from belts 76.

It is seen therefore that the distance of the upper pressure belts 142 and 144 from belts 76 can be adjusted, and the pulley assemblies 144, 145, 146, 147 can also be moved along their support rods 186 and 208 laterally of the longitudinal center axis of the belts 76 so that selected portions of the dough pieces may be subjected as desired to the pressure of these upper belts. Moreover, the separate pulleys of the upper pressure conveyor can be adjustably moved on their supporting shafts 148, 150, 168 and 170 to provide various degrees of divergence of the belts 140 and 142. The various adjustments therefore of belts 76, 140 and 142 with respect to each other make it possible to subject selected portions of the dough pieces to stretching and also allows the degree of stretching to be accurately controlled.

With both embodiments of the invention, it is possible to perform the stretching operation with a minimum working or damage to the dough piece and at a high rate of speed since the speed of the stretching conveyor units may be set at any level necessary to match the production rate of the remaining bread making equipment. There is, however, some advantage in performing the stretching function over a significant period of time—in other words, it is better to stretch slowly than rapidly. This may be achieved with both constructions shown in the present application by simply making the stretching conveyor section long enough to provide whatever time is required at whatever speed of production is desired.

While several forms of the invention have been shown and described, it is apparent that variations in the construction and arrangement of the parts of the mechanism may be made without departing from the spirit and scope of the appended claims.

What is claimed is:

1. Apparatus for stretching dough pieces comprising a conveyor on which the dough pieces may be deposited and conveyed in a direction at right angles to the direction of desired stretching, said conveyor consisting of a plurality of individual narrow belts which extend in spaced relation in generally the same direction with the dough engaging portions of said belts at an input end of said conveyor being spaced apart at like increments, the dough engaging portions of said belts diverging from each other in the direction of travel of the dough pieces supported thereon, the dough engaging portions of said belts at a discharge end of said conveyor being spaced apart at like increments relatively larger than the spacing of said belts at the input end of said conveyor, the individual belts being of such width and the belts being so spaced that they will indent into the dough piece sufficiently to resist slipping of the dough piece transversely of the belt, and adjusting means at the input end of said conveyor for concomitantly varying the spacing between said belts like amounts thereby to vary the divergence thereof.

2. Apparatus for stretching dough pieces comprising a conveyor on which the dough pieces may be deposited and conveyed in a direction at right angles to the direction of desired stretching, said conveyor consisting of a plurality of individual narrow belts which extend in spaced relation in generally the same direction with at least certain of said belts diverging from each other in the direction of travel of the dough pieces supported thereon, and adjusting means engaging at least certain of said belts for adjusting the divergence thereof, said adjusting means comprising a plurality of pins extending between said belts and supported on an expansible support, said support having a multiple parallelogram construction and being expansible substantially transversely to the longitudinal axis of said belts.

3. A dough stretching apparatus comprising a first pair of rollers having their axis of rotation in substantially the same horizontal plane and in intersecting vertical planes, a second pair of rollers also having their axis of rotation in substantially the same horizontal plane and in intersecting vertical planes, a plurality of belts supported on and extending between said first and second pairs of rollers, and adjusting means extending between said belts and adapted to adjust the spacing between said belts to provide varying degrees of divergence thereof.

4. Apparatus for stretching dough pieces comprising a conveyor on which the dough pieces may be deposited and conveyed in a direction at right angles to the direction of desired stretching, said conveyor consisting of a plurality of individual narrow belts which extend in spaced relation in generally the same direction with at least certain of said belts diverging from each other in the direction of travel of the dough pieces supported thereon, hold down means positioned over said conveyor for engaging said dough pieces and holding them against said conveyor for at least a portion of their travel thereon, said hold down means comprising a plurality of belts movable in the direction of travel of said dough pieces, and adjusting means engaging at least certain of said belts for adjusting the divergence thereof.

5. Apparatus for stretching dough pieces comprising a conveyor on which the dough pieces may be deposited and conveyed in a direction at right angles to the direction of desired stretching, said conveyor consisting of a plurality of individual narrow belts which extend in spaced relation in generally the same direction with at least certain of said belts diverging from each other in the direction of travel of the dough pieces supported thereon, hold down means positioned over said conveyor for engaging said dough pieces and holding them against said conveyor for at least a portion of their travel thereon, said hold down means comprising a plurality of belts movable in the direction of travel of said dough pieces, adjusting means engaging at least certain of said belts for adjusting the divergence thereof, and adjustable support means for said hold down means and adapted for moving the same toward and away from said conveyor.

6. Apparatus for stretching dough pieces comprising a conveyor on which the dough pieces may be deposited and conveyed in a direction at right angles to the direction of desired stretching, said conveyor consisting of a plurality of individual narrow belts which extend in spaced relation in generally the same direction with at least certain of said belts diverging from each other in the direction of travel of the dough pieces supported thereon, hold down means positioned over said conveyor for engaging said dough pieces and holding them against said conveyor for at least a portion of their travel thereon, said hold down means comprising a plurality of belts movable in the direction of travel of said dough pieces, adjusting means engaging at least certain of said belts for adjusting the divergence thereof, and adjustable support means for said hold down means and adapted for moving the same toward and away from said conveyor and also transversely to the plane thereof.

7. Apparatus for stretching dough pieces comprising a conveyor on which the dough pieces may be deposited and conveyed in a direction at right angles to the direction of desired stretching, said conveyor consisting of a plurality of individual narrow belts which extend in spaced relation in generally the same direction with at least certain of said belts diverging from each other in the direction of travel of the dough pieces supported thereon, the individual belts being of such width and the belts being so spaced that they will indent into the dough piece sufficiently to resist slipping of the dough piece transversely of the belt, anti-friction roller means positioned beneath the dough piece supporting run of said belts to limit sagging of the belts and of the dough pieces, and adjusting means engaging at least certain of said belts for adjusting the divergence thereof.

8. A dough stretching apparatus comprising a first pair of rollers having their axis of rotation in substantially the same horizontal plane and in intersecting vertical planes, inboard and outboard shaft supports for each of said rollers, said outboard supports being spaced from the outer end of their respective rollers to allow the roller shafts to be moved axially through said outboard supports a sufficient distance to disengage said roller shafts from their inboard supports, a second pair of rollers also having their axis of rotation in substantially the same horizontal plane and in intersecting vertical planes, a plurality of belts supported on and extending between said first and second pairs of rollers, and adjusting means extending between said belts and adapted to adjust the spacing between said belts to provide varying degrees of divergence thereof.

9. A dough stretching apparatus comprising a first pair of rollers having their axis of rotation in substantially the same horizontal plane and in intersecting vertical planes, inboard and outboard shaft supports for each of said rollers, said outboard supports being spaced from the outer end of their respective rollers to allow the roller shafts to be moved axially through said outboard supports a sufficient distance to disengage said roller shafts from their inboard supports, a second pair of rollers also having their axis of rotation in substantially the same horizontal plane and in intersecting vertical planes, said intersecting vertical planes of said first and second pairs of rollers being substantially parallel so as to minimize distortion of said belts in obtaining the desired divergence thereof, a plurality of belts supported on and extending between said first and second pairs of rollers, and adjusting means extending between said belts and adapted to adjust the spacing between said belts to provide varying degrees of divergence thereof.

10. A dough stretching apparatus comprising a first pair of rollers having their axis of rotation in substantially the same horizontal plane and in intersecting vertical planes, a second pair of rollers also having their axis of rotation in substantially the same horizontal plane and in intersecting vertical planes, a plurality of belts supported on and extending between said first and second pairs of rollers, and adjusting means extending between said belts adjacent one of said pairs of rollers and adapted to adjust the spacing between said belts to provide varying degrees of divergence thereof.

11. A dough stretching apparatus comprising a first pair of rollers having their axis of rotation in substantially the same horizontal plane and in intersecting vertical planes, a second pair of rollers also having their axis of rotation in substantially the same horizontal plane and in intersecting vertical planes, a plurality of belts supported on and extending between said first and second pairs of rollers, adjusting means extending between said belts adjacent one of said pairs of rollers and adapted to adjust the spacing between said belts to provide varying degrees of divergence thereof, said one pair of rollers having a smooth belt supporting surface for facilitating positioning of said belts thereon, and guide means on said other pair of rollers for non-adjustably positioning said belts thereon.

12. A dough stretching apparatus comprising a first pair of rollers having their axis of rotation in substantially the same horizontal plane and in intersecting vertical planes, a second pair of rollers also having their axis of rotation in substantially the same horizontal plane and in intersecting vertical planes, a plurality of belts supported on and extending between said first and second pairs of rollers, guide means on said second pair of rollers for spacing said belts thereon, and adjusting means extending between said belts adjacent one said first pair of rollers and adapted to adjust the spacing between said belts on said first pair of rollers to provide varying degrees of divergence of said belts.

13. Apparatus for stretching dough pieces comprising a conveyor on which the dough pieces may be deposited and conveyed in a direction at right angles to the direction of desired stretching, said conveyer consisting of a plurality of individual narrow belts mounted on spaced roller means and extending in spaced relation in generally the same direction with at least certain of said belts diverging from each other in the direction of travel of the dough pieces supported thereon, said roller means comprising pairs of rollers independently mounted in substantially end-to-end relationship by inner and outer supports, said rollers being axially movable outwardly from their inner supports to allow for replacement of said belts, and adjusting means positioned in close proximity to one of said rollers means and engageable with said belts for positioning the same on said one roller means to adjust the divergence of said belts.

14. Apparatus for stretching dough pieces comprising a conveyor on which the dough pieces may be deposited and conveyed in a direction at right angles to the direction of desired stretching, said conveyer consisting of a plurality of individual narrow belts mounted on spaced roller means and extending in spaced relation in generally the same direction with at least certain of said belts diverging from each other in the direction of travel of the dough pieces supported thereon, said roller means comprising pairs of rollers independently mounted in substantially end-to-end relationship by inner and outer supports, said rollers being axially movable outwardly from their inner supports to allow for replacement of said belts, said one roller means having a smooth belt engaging surface for allowing side pressure on said belts to readily move them axially of said rollers.

15. Apparatus for stretching dough pieces comprising a conveyor on which the dough pieces may be deposited and conveyed in a direction at right angles to the direction of desired stretching, said conveyer consisting of a plurality of individual narrow belts mounted on spaced roller means and extending in spaced relation in generally the same direction with at least certain of said belts diverging from each other in the direction of travel of the dough pieces supported thereon, said roller means comprising pairs of rollers independently mounted in substantially end-to-end relationship by inner and outer supports, said rollers being axially movable outwardly from their inner supports to allow for replacement of said belts, said one roller means having a smooth belt engaging surface for allowing side pressure on said belts to readily move them axially of said rollers, and guide means on the other of said roller means for maintaining the spacing of said belts thereon.

16. In a dough stretching apparatus having a plurality of dough stretching belts mounted and extending between spaced roller means, adjusting means for varying the divergence of said belts comprising a series of expansible parallelograms carrying a plurality of pins which move apart from each other as said parallelograms are expanded, said pins extending between said belts adjacent one of said roller means and adapted to engage said belts to adjust the distance therebetween on said one roller means, said belts being stationarily positioned with respect to each other on the other of said roller means.

17. In a dough stretching apparatus having a plurality of dough stretching belts mounted and extending between spaced roller means, adjusting means for varying the divergence of said belts comprising a series of expansible parallelograms carrying a plurality of pins which move apart from each other as said parallelograms are expanded, said pins extending between said belts adjacent one of said roller means and adapted to engage said belts to adjust the distance therebetween on said one roller means, said belts being stationarily positioned with respect to each other on the other of said roller means, and a plurality of hold down belts positioned over said dough stretching belts and movable with said dough stretching belts to hold the dough firmly thereon.

18. In a dough stretching apparatus having a plurality of dough stretching belts mounted and extending between spaced roller means, adjusting means for varying the divergence of said belts comprising a series of expansible parallelograms carrying a plurality of pins which move apart from each other as said parallelograms are expanded, said pins extending between said belts adjacent one of said roller means and adapted to engage said belts to adjust the distance therebetween on said one roller means, said belts being stationarily positioned with respect to each other on the other of said roller means, a plurality of hold down belts positioned over said dough stretching belts and movable with said dough stretching belts to hold the dough firmly thereon, and means for adjusting the position of said hold down belts with respect to said stretching belts.

References Cited by the Examiner
UNITED STATES PATENTS

| | | | |
|---|---|---|---|
| 1,674,229 | 6/28 | Scruggs | 107—9.3 |
| 1,938,110 | 12/33 | Neutelings | 107—4.4 X |
| 2,346,673 | 4/44 | Geertsen | 83—107 |
| 2,696,253 | 12/54 | Hartman | 83—201 |
| 2,892,422 | 6/59 | Casale | 107—4.2 |

CHARLES A. WILLMUTH, *Primary Examiner.*

J. D. SEERS, *Examiner.*